May 9, 1933. W. D. JORDAN 1,907,977
MECHANISM FOR FOLDING AND GLUING RECEPTACLES
Filed July 7, 1930 6 Sheets-Sheet 1

Fig. 1.

Inventor:
Warren D. Jordan
by Roberts, Cushman & Woodberg
Att'ys.

May 9, 1933.  W. D. JORDAN  1,907,977

MECHANISM FOR FOLDING AND GLUING RECEPTACLES

Filed July 7, 1930   6 Sheets-Sheet 3

Inventor
Warren D. Jordan
by Roberts Cushman + Woodbury
Attys.

May 9, 1933.  W. D. JORDAN  1,907,977
MECHANISM FOR FOLDING AND GLUING RECEPTACLES
Filed July 7, 1930  6 Sheets-Sheet 5

Inventor
Warren D. Jordan
by Roberts, Cushman & Woodbury
Att'ys.

Patented May 9, 1933

1,907,977

UNITED STATES PATENT OFFICE

WARREN D. JORDAN, OF EAST WEYMOUTH, MASSACHUSETTS, ASSIGNOR TO CHARLES P. WELLMAN, OF WEST MEDFORD, MASSACHUSETTS

MECHANISM FOR FOLDING AND GLUING RECEPTACLES

Application filed July 7, 1930. Serial No. 466,173.

This invention relates to devices for performing folding and other operations on the material of a receptacle, such for example as a carton, or parts of a wrapped package or the like, and to an art or method of fastening with adhesive the closure flaps of receptacles or packages.

One object of the invention is to provide for rapid folding and preferably also sealing of such flaps by instrumentalities occupying relatively small space, and to this end, to utilize two-stroke relative movement of the operating mechanism and receptacle operated on, with some of the necessary operations being performed on the forward stroke and other of the operations being performed on the return stroke. As will be apparent from this specification such forward and return strokes may be effected by moving either the operating mechanism or the receptacle relative to the other, the cycle comprising the forward and return strokes being characterized by intervening reversal of direction of such relative movement. Particularly the invention permits of economy of length of the movements necessary to effect closing and fastening receptacle closures, and permits simplification and coordination of direction of such movements.

Another object of the invention is to provide an organization of folding instrumentalities so disposed with respect to each other and to the path of relative movement of the mechanism and receptacle that movement of the folding instrumentalities relative to each other or transversely of the path of relative movement may be minimized. This permits the construction of mechanism wherein numerous applications of force to the various receptacle elements are effected by increments of a cyclic relative movement of the receptacle and group of folding instrumentalities, so that the operation of the mechanism as a whole is simple. As a result, in case the operating instrumentalities are to move, many or all of them may move together as a unit in a simple cyclic movement, or in case the receptacle is to move, many of the operating instrumentalities may remain in a fixed position.

Another object of the invention is to provide folding instrumentalities for folding receptacle closure elements comprising the usual two full sized flaps and two half sized flaps, or analogous closures including large and small flaps, in such an order that the small flaps will lie between the larger, usually full sized, flaps, when closed.

Another object of the invention is so to relate an adhesive applying instrumentality to the folding instrumentalities that none of the latter need to contact with adhesive-coated surfaces.

A further object of the invention is to provide an improved organization of folding and adhesive-applying instrumentalities wherein a single applicator, such for example as a glue roller, is enabled to apply adhesive sequentially to a plurality of closure flaps of the receptacle, the device serving to present the flap surfaces in proper position to be operated on by the applicator. Another object of the invention is so to coordinate the operations of the folding instrumentalities and adhesive applicator that the adhesive applicator may occupy during operation a substantially constant position with relation to numerous of the folding instrumentalities, with resulting simplicity of operation.

Obviously in many instances it may be desirable to attain certain only of these objects. Other objects of invention, and advantages of process, mode of operation and construction, will appear from a consideration of an explanation of a specific instance of the invention as illustrated in the accompanying drawings.

In the drawings:

Fig. 1ᵇ is an end elevation of the device of Fig. 1;

Figs. 3ᵇ, 5ᵇ, 6ᵇ and 7ᵇ are fragmentary vertical sectional views taken at right angles to the corresponding views 3, 5, 6 and 7;

Fig. 7ˣ is a side elevation partly in section similar to Fig. 1 but showing the relative position of the receptacle and folding apparatus which corresponds to Fig. 7;

Figs. 2ᵃ and 7ᵃ are bottom views of the folding and adhesive-applying instrumentalities of the device, these figures corresponding to the positions shown in Figs. 2 and 7 respectively;

Preferably the folding and adhesive-applying instrumentalities are grouped into a compact unit retained by a frame-like holder 1, and the movement necessary to effect the folding and gluing operations is obtained by a two stroke relative movement of the receptacle and this holder 1. Figs. 1 to 11 inclusive illustrate various positions of the receptacle relative to the folding and adhesive-applying instrumentalities of holder 1. This cycle of movement may be obtained either by bodily moving the holder 1 and its retained folding and adhesive-applying instrumentalities, or by moving the receptacle itself, the construction of the essential parts of the mechanism being the same in either case, but the operation of the device when the receptacle is moved permitting elimination of certain driving elements which are utilized in case the folding and adhesive-applying instrumentalities are moved. By way of example, the illustrated mechanism is shown as adapted for movement of the folding instrumentalities as a unit with respect to a relatively stationary receptacle.

Figure 1:
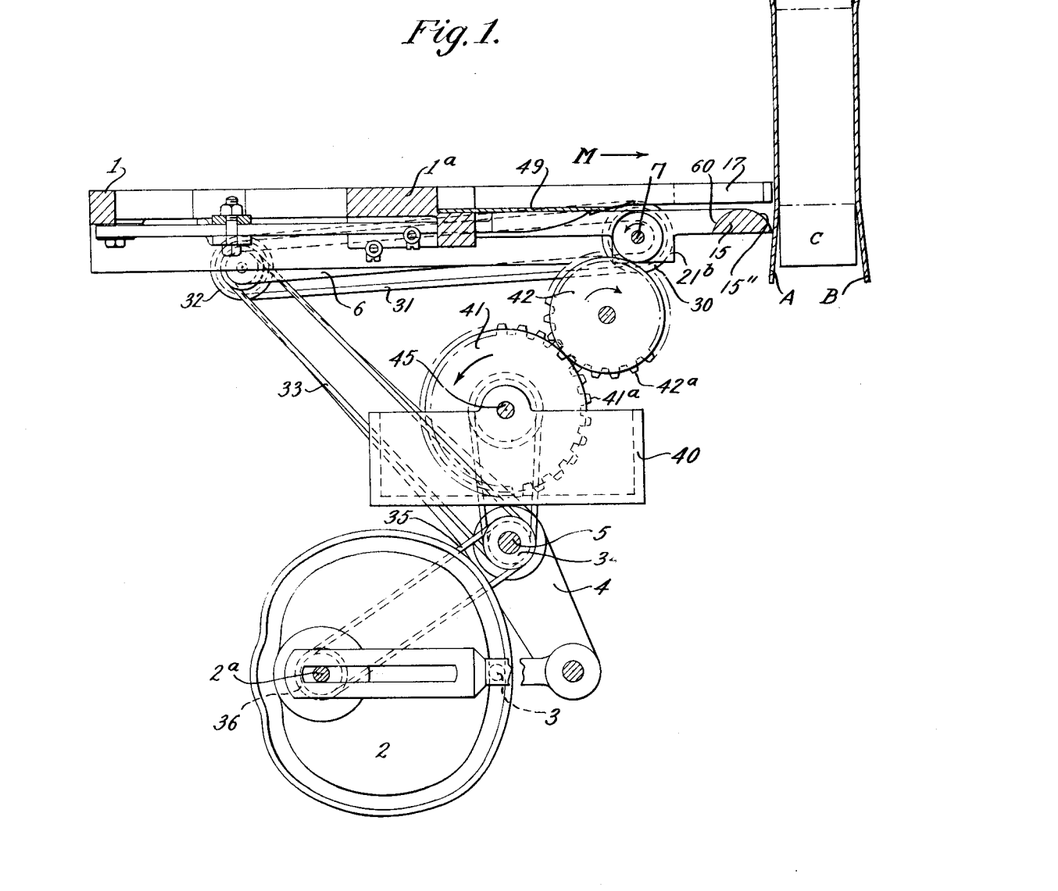
Fig. 1 is a side elevation partly in section of a folding mechanism embodying my invention, the main frame of the device being omitted for clarity of illustration.
Figure 7:
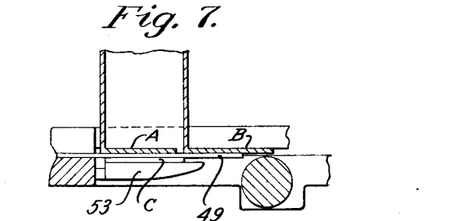
Figure 7X:
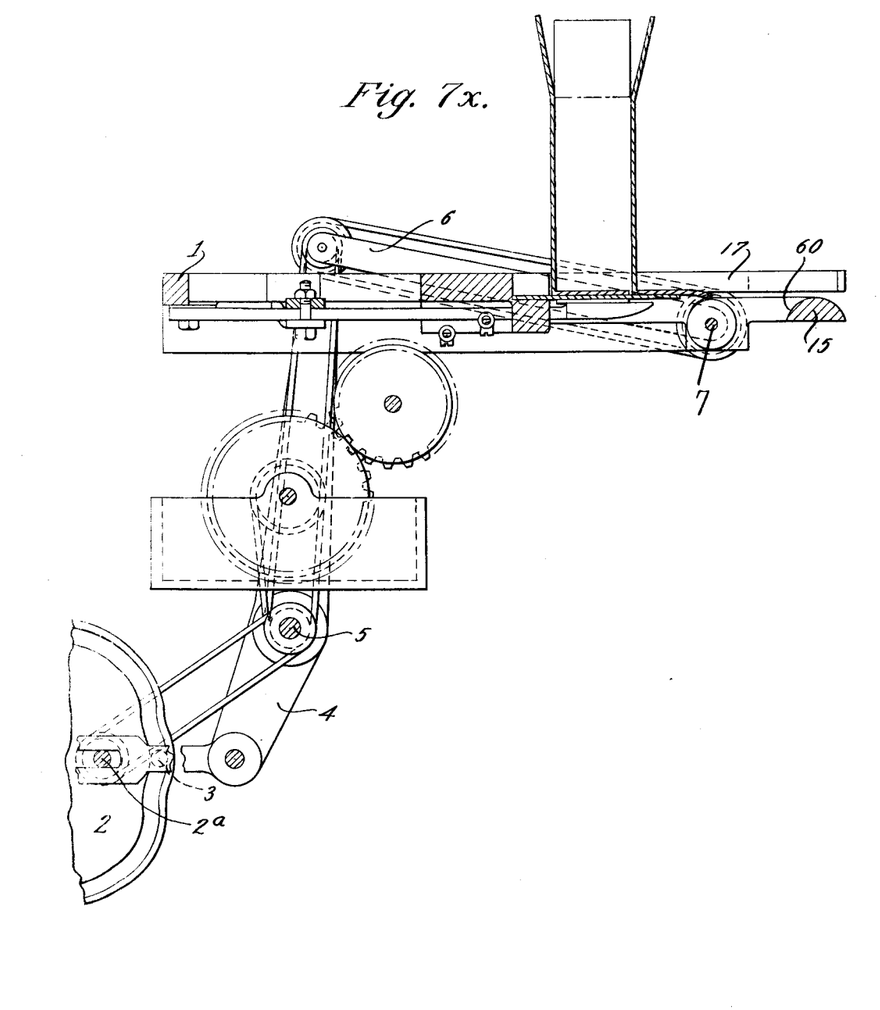

Referring to Figs. 1 and 7ˣ, which show the device at opposite ends of its stroke, the holder 1 and its retained folding and adhesive-applying instrumentalities are moved to and fro by driving mechanism which is illustrated by way of example as comprising a cam 2 driven by a cam shaft 2ᵃ, a cam follower 3, the levers 4 pivotally mounted at 5, and connecting links 6 joined to the extreme end of levers 4 and pivoted to the holder 1 at 7. Rotation of the cam shaft 2ᵃ thus causes a back and forth horizontal movement of the holder 1. As explained above this driving mechanism may be dispensed with in case the receptacle is to be moved and the folding instrumentalities retained generally stationary. Any suitable frame may be provided for the device, and is herein indicated by the reference character 70 (Fig. 1ᵇ). Adjacent to the holder 1, the frame may include guides or ways 71 within which tongues 72 integral with the holder 1 may slide.

Receptacles intended to have their ends closed and sealed may be presented to the mechanism with their flaps to be operated on extending in substantial prolongation of the adjacent receptacle walls. It will be understood that the receptacle may be presented to the mechanism described herein either by hand, or by any suitable device capable of holding the receptacles, such devices not being illustrated since they form no part of the present invention.

Figure 6:
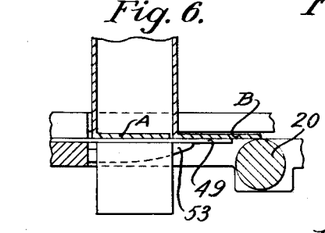
Figure 6B:
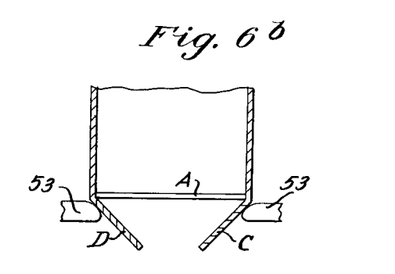

By way of example, the receptable illustrated in the accompanying drawings (see Figs. 1, 3ᵇ and 6ᵇ) is shown as provided with the usual full sized rectangular closure flaps A and B, comprising extensions of major faces of the receptacle and each of a size and area sufficient to cover completely the end of the receptacle, and the usual half size rectangular flaps C and D comprising extensions of smaller faces of the receptacle and of about half the area of the full sized flaps. By way of example the illustrated device is shown as adapted to operate on all four of these flaps. The present invention is not limited to the operation of the mechanism or method explained herein on receptacles having as many as four such flaps except as specified in certain of the appended claims. As indicated by the arrow M in Fig. 1, the direction of progression of the folding and adhesive-applying instrumentalities is transverse to a major face of the receptacle, which carries one of the full-sized flaps A, hereinafter called the forward flap.

Figure 2:
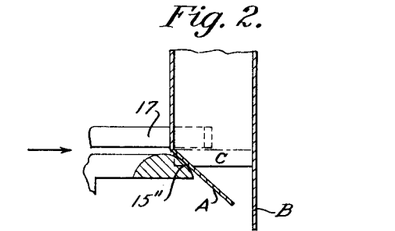
Figs. 2 to 11 inclusive are vertical sections through a receptacle and part of the folding mechanism operating thereon, these figures illustrating the progress of the folding operation from the position of Fig. 1 to completion.
Figure 3:
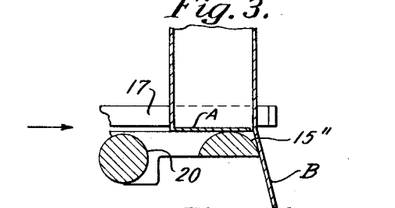
Figure 3B:
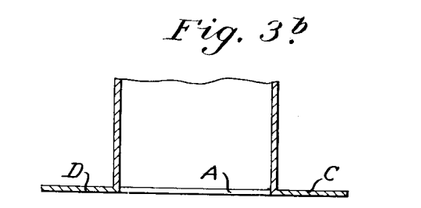

The initial function of the folding instrumentalities, (although not an indispensable function), is to swing the side flaps C and D from their vertical position to approximately horizontal positions transverse to the receptacle and extending outwardly therefrom, for instance, from the position of the flap C shown in Fig. 1 to the position shown in Fig. 3ᵇ. To this end the holder 1 is preferably provided with a projecting plow member 15 connected to the holder by side extension 15ᵃ having slanting side surfaces 15′ at their outer sides, the width of the forward end of the plow member 15 between side surfaces 15′ being somewhat less than the width of a major face of the receptacle to be folded. The slanting side surfaces 15′ of this plow members 15 are beveled toward their tops as shown in Fig. 1ᵇ, thus to engage the originally unfolded flaps C and D at the sides of the receptacle and move them by a camming action into horizontal positions such as shown in Fig. 3ᵇ. Referring to Fig. 2, one of the side flaps C is shown as partly elevated to this horizontal position. Simultaneously with this action the forward surface 15″ of the projecting plow member 15 engages the forward flap A of the receptacle and swings it through the position of Fig. 2 in the horizontal position of Fig. 3.

As will appear from an explanation below of an adhesive applicator adapted to operate upon the forward flap A of the receptacle according to the same cycle of relative movement as the folding instrumentalities, movement of this forward flap A into its ultimate horizontal position may be effected by contact with such adhesive applicator rather than with the described plow 15. Thus in case such an adhesive applicator is employed, as described below, modification of the device to eliminate the folding of forward flap A by plow member 15 or corresponding instrumentality will not prevent the receptacle parts from attaining the desired ultimate folded positions.

Figure 4:
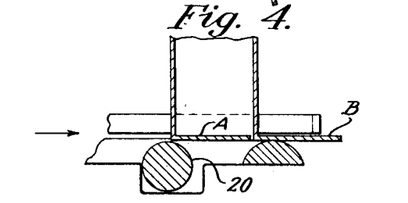

The extent of the forward relative movement of the folding instrumentalities with respect to the receptacle is preferably such that the forward surface 15″ of the projecting plow member engages the rear flap B of the receptacle and swings it through the position of Fig. 3 into an approximately horizontal position, as shown in Fig. 4. At the conclusion of these described preferable operations all four of the closure flaps of the illustrated receptacle are in substantially horizontal positions, the forward flap A extending across the previously open end of the receptacle, the rear flap B extending to the rear of the receptacle and the two side flaps C and D extending outwardly to either side of the receptacle, these positions of the various flaps being shown in Figs. 4 and 3$^b$.

In order more definitely to position the receptacle with respect to the folding instrumentalities, longitudinal guides 17 (Fig. 1) are preferably provided, having surfaces spaced vertically from the projecting plow member 15 a distance sufficient to accommodate the two horizontally extending side flaps C and D, and spaced with respect to each other (Figs. 1$^b$ and 2$^a$), a distance slightly greater than the width of the major face of the receptacle so that the opposed surfaces of these members guide the sides of the receptacle. As indicated above, the provision of the lateral extensions 15$^a$ of the plow member 15 with their slanting side surfaces 15′, and the performance of the function of these parts of camming the side flaps outwardly into a horizontal position is not essential to certain principles of my invention. However by accomplishing this function certain other parts of the mechanism are greatly simplified, particularly an adhesive applicator, preferably employed in sealing the receptacle, which applicator may, in such case take the form of a roll having a driving shaft extending through the path which would have been traversed by these side flaps had they not been turned out of vertical positions. Furthermore, by turning the side flaps into horizontal positions, as described above, both the forward and rear flaps A and B are more fully exposed to the action of an adhesive applicator, for with the side flaps automatically plowed out of the way, such adhesive applicator may be made of the full width of the forward flaps A and B without danger of interference.

In the illustrated embodiment of the invention an adhesive applicator is provided in the form of a roll 20 (Fig. 2$^a$), of a width substantially equal to that of the originally open end of the receptacle and the forward and rear flaps A and B, the roll 20 being mounted on its drive shaft 21 in a position wherein its peripheral surface may rotate substantially tangentially to and sweep the plane of the folded flaps A and B and the plane of ultimate closure of all of the flaps. The drive shaft 21 is preferably journaled within journal blocks 21$^a$ and 21$^b$ which preferably comprise rearward continuations of the side portions 15′ of the plow member 15, at either side of the roll 20. The arrangement of these parts is such that receptacle side flaps cammed outwardly into generally horizontal positions by the side portions 15′ of the plow are free to pass smoothly over the upper surface of these journal blocks 21$^a$ and 21$^b$ (see Fig. 1) until the forward flap A has passed the roll 20. In this way these journal blocks 21$^a$ and 21$^b$ perform the function of guides for the side flaps of the receptacle.

Fig. 4 illustrates the progression of the holder with respect to the receptacle to such a point that the forward flap A just touches the adhesive applying roll 20. Further progression of the holder 1 with respect to the receptacle carries the adhesive-applying roll 20 across the forward flap A and preferably across the rear flap B (Fig. 6), although such direct application of adhesive to the rear flap B by the roll is not essential.

Figure 5:
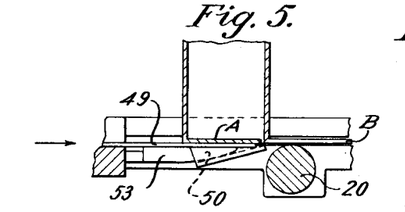

While the function of the roll 20 with respect to the forward flap A is primarily to apply adhesive thereto, it will readily be apparent that this instrumentality is capable also of folding either or both of the forward and rear flaps A and B into horizontal positions, such as are shown in Figs. 5, 6 and 7. This is of particular utility in case these flaps tend to spring toward their original depending positions upon passing the plow member 15 on the forward stroke of the operation, or in case of modification of the device to eliminate the folding function of the plow member 15 with respect to the forward flap A.

The adhesive-applying roll 20 is preferably driven in such a direction and at such speed that on the forward stroke of the operation, it moves over the flaps with a substantially pure rolling movement, as distinguished from a scraping movement, in the present instance such movement being effected by driving the adhesive-applying roll in a counterclockwise direction. A preferable arrangement of driving connections for thus driving the adhesive-applying roll comprises (Figs. 1, 1$^b$ and 2$^a$) a driving pulley 30 fast to the drive shaft 21 of the applicator roll 20, a drive belt 31 connecting the pulley 30 with a double-grooved freely revolvable pulley 32 mounted at the junction of the pivoted links 4 and 6, as shown in Figs. 1 and 1$^b$, a second drive belt 33 connecting the pulley 32 with a pulley 34 mounted on the axis of rotation of the pivoted link 4, and a third driving belt 35 connecting this last pulley with a pulley 36 fast on the cam shaft 2$^a$ which drives the machine. This arrangement of parts is such that the adhesive-applying roll 20 is driven continuously in a counterclockwise direction as viewed in Fig. 1.

For the purpose of supplying adhesive to the applicator roll 20, adhesive-supplying mechanism comprising a glue pot 40 having mounted therein a glue roll 41, is preferably provided. The glue roll 41 serves to convey glue to the peripheral surface of a secondary roll 42, these two rolls being geared together by the provision of intermeshing gear teeth 41$^a$ and 42$^a$, (Fig. 1$^b$). The roll 42, which is prerably adjustable in the path of an arc about the axis of roll 41, is placed in such a position that it is contacted with by the peripheral surface of the adhesive-applying roll 20 at the end of the stroke of the holder 1 as shown in Fig. 1. The glue roll 41 may conveniently be driven from the same driving connection as the adhesive-applying roll 20 by the provision of a drive belt 43 connecting a drive shaft 45 of the glue roll with the pulley 34.

Preferably means as provided for retaining the initially folded forward flap A from springing out of its folded horizontal position after leaving the roll 20 on the forward stroke. Such means is shown by way of example as comprising a tongue 49 (Figs. 1, 2$^a$, 5, 6, 7 and 8) extending horizontally toward the roll 20 from a transverse part 1$^a$ of the holder 1.

The illustrated preferred form of device includes folding instrumentalities effective to move the side flaps C and D of the receptacle toward a closed position by a camming action or plowing after these flaps have passed the journal blocks 21$^a$ and 21$^b$ of the applicator roll 20. In the present instance this operation is performed by oppositely disposed cam or plow surfaces 50, (Figs. 2$^a$ and 5) arranged in the path of the side flaps after the latter have passed the axis of the applicator roll 20. Figs. 4 and 5, or Figs. 3$^b$ and 5$^b$, will illustrate the manner in which a side flap C is moved by camming action toward a closed position. This camming action may, as in the operation of the illustrated device, be initiated before the side flaps have completely passed the applicator roll 20 or the journal blocks 21$^a$ and 21$^b$. Obviously in some cases gravity, or the natural resilience of the receptacle material may be utilized partially to swing the side flaps C and D from their horizontal positions after passing the guiding surface of the journal blocks 21$^a$ and 21$^b$. However, the positively acting cam surfaces 50 are preferable in that they act more surely and quickly.

The folding and adhesive-applying operations described up to this point (to the position of Fig. 5) have been effected without bodily movement of the various reacting instrumentalities with respect to each other, or without movement thereof transverse to, or at variance with, the direction of relative movement of the receptacle and holder 1. At this stage in the cycle of operations, and in order to render the operating stroke as short as possible, the side flaps C and D are preferably moved to completely closed positions by folding instrumentalities which move transversely of the direction of relative movement of the receptacle and holder. By way of example these instrumentalities are shown as comprising tucker fingers 53 adapted to move toward each other with their upper surfaces sweeping the plane to be occupied by the closed side flaps C and D. Advantageously these tucker fingers 53 may carry the cam surfaces 50 previously described. The operation of the tucker fingers 53 upon the side flaps will be apparent from Figures 5, 6 and 7, (or 5$^b$, 6$^b$ and 7$^b$) wherein a finger 53 is shown as carrying a side flap C from the partially curved position to which it has been moved by the cam or plow surface 50, through the instantaneous position of Figs. 6 or 6$^b$ to the flat position of Figs. 7 or 7$^b$, generally parallel to and adjacent to the previously coated surface of the forward flap A.

With regard to the preferable provision of and cooperative relation between the cam surfaces 50 and tucker fingers 53, the cam surfaces 50 which move the side flaps somewhat out of the horizontal plane, permit the use of tucker fingers which move horizontally and are thus able to sweep over the folded side flaps C and D to insure correct ultimate positioning of these flaps, and yet which may be of such thickness as not unduly to concentrate the initial application of force to the side flaps at the junctions of the side flaps and their adjacent walls, as in case the tucker fingers were very thin.

Preferable operating mechanism for the tucker fingers 53 comprises arms 54, upon which the tucker fingers may be integrally mounted, suitably pivoted for instance at 55 to the holder 1 and provided with connecting toggles 56 operating between two stops 57 and 58 (Fig. 2$^a$). Suitable tension springs 59 and 60 may be provided as shown in Fig. 2$^a$ tending to swing the arms 54 together. In operation of the device by movement of the holder 1 and its retained instrumentalities back and forth, the stops 57 and 58 may be fixed at such points that they will engage the toggle joint 56$^a$ at opposite ends of the operating strokes. Fig. 2$^a$, in which the holder 1 is shown at the end of its stroke, shows the toggle 56 just engaging the fixed stop 57. Movement of the holder 1 toward the left in Fig. 7ᵃ will cause fixed stop 57 to spring the toggle 56 to the position shown in Fig. 2ᵃ wherein the tucker fingers 53 are held at spaced distances by the toggle 56 in position to receive side flaps C and D. Then, movement of the holder 1 toward the right in Fig. 2ᵃ in its forward operating stroke will cause the fixed stop 58 to force the toggle 56 into a position wherein the springs 59 and 60 will swing the toggle to the position of Fig. 7ᵃ, thus swinging the tucker fingers 53 toward each other and effecting the folding operation just described. In the event, however, that the holder 1 and its retained instrumentalities are to be held stationary and the receptacle is to move, the stops 57 and 58 will then be moved to and fro in synchronism with the receptacle, thus effecting the same relative movement with respect to the toggle as is obtained in the illustrated embodiment of the invention.

At the time of actuation of the tucker fingers 53 and consequent closure of the side flaps C and D, the cam 2 will have reached its point of maximum throw, whereupon subsequent rotation of the cam will effect the return stroke of the operating cycle. Upon this return stroke, illustrated by the successive positions of Figs. 7 to 11, the rear flap B, previously coated by the applicator roll 20, will again be coated by passing over the roll a second time in the opposite direction. In this return stroke the exposed surfaces of the folded and closed side flaps D and C will likewise pass over the applicator roll and will receive adhesive therefrom. It is therefore unnecessary that the rear flap B receive adhesive from the applicator 20, since the exposed surfaces of the side flaps C and D which will ultimately contact with the under surface of the rear flap B are themselves coated with adhesive. However, such double application of adhesive assures a more even distribution and renders the joint more secure.

Figure 8:
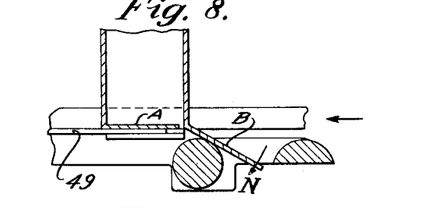
Figure 9:
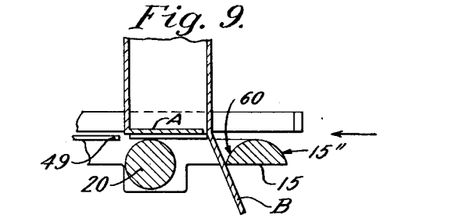
Figure 10:
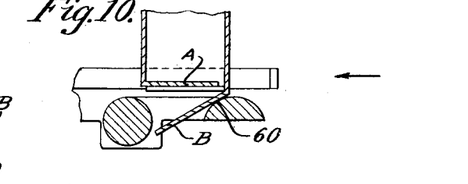
Figure 11:
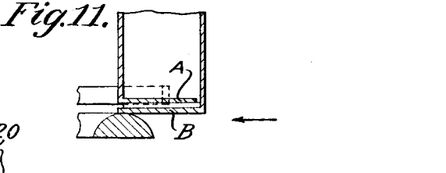

Upon partially passing the applicator roll 20 upon the return stroke the rear flap B of the receptacle, due to its natural resiliency, tends to swing toward its initial vertical position, moving in the direction of the arrow N in Fig. 8. This phenomena is utilized to present this rear flap B in position to be reacted upon by the final folding instrumentalities of the device. As shown in Figs. 8 and 9 the forward plow member 15 of the device is spaced sufficiently from the applicator roll 20 to permit the rear flap B of the receptacle to pass therebetween into the position of Fig. 9. The plow member 15 of the device is preferably provided with a cam surface 60 disposed in an opposite direction to the forwardly disposed cam surface 15″, and adapted to engage the rear flap B of the receptacle as this flap leaves the adhesive-applying roll on the return stroke. Figs. 10 and 11 illustrate successive positions of the rear flap B as it is engaged by the cam surface 60 and folded thereby into a closed position overlying the previously folded and coated side flaps C and D. The provision of the two cam surfaces 15″ and 60 upon the same plow member of the device, which is a preferable construction, renders the device extremely compact and shortens the length of the stroke required for folding of the various flaps.

The novel method pointed out more particularly in the claims and exemplified by the described step of closing the flaps with direct applications of adhesive to the outer surfaces of closed flap A, and to a subsequently closed side flap C or side flaps C and D, followed by closing flap B, permits of economy of length and simplicity of direction of motion required to effect closure and fastening.

Figures 5B, 7B, 12:
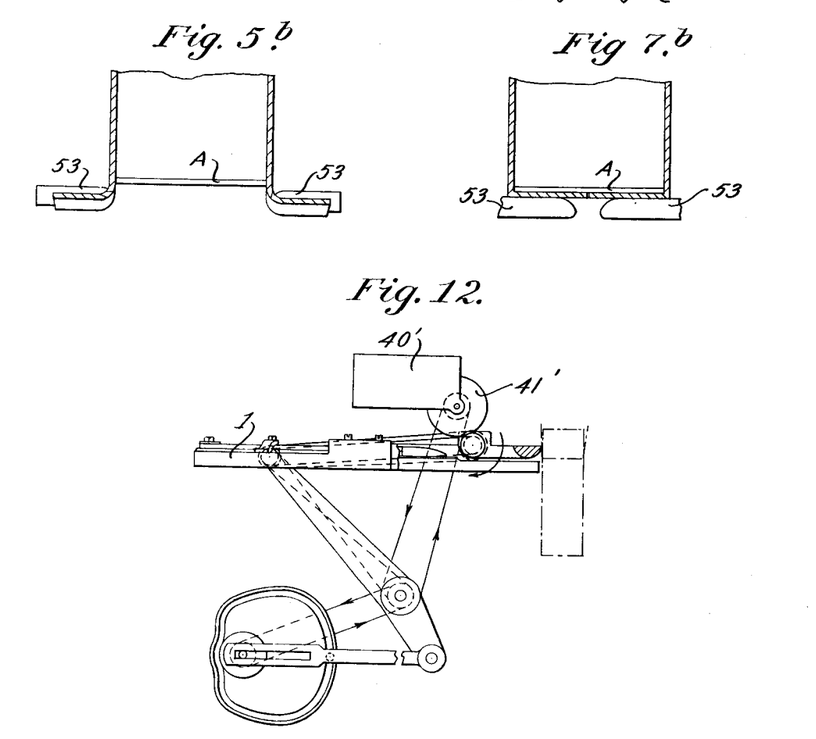
Fig. 12 is a diagrammatic side elevation of a modification of the device of the other figures, adapted more particularly to fold and seal the top flaps of a receptacle.

While the device has been particularly described as applied to closing and sealing the bottom flaps of an empty receptacle it will readily be apparent that the same mechanism, with parts suitably inverted, is adapted to close and seal the top flaps of a filled receptacle. In Fig. 12, such an arrangement is shown, in this case the holder 1 and its retained instrumentalities being inverted with respect to Fig. 1, and a suitable glue pot 40′, and glue roller 41′ being provided above the holder, instead of below as in the previously described embodiment.

I claim:

1. Mechanism for closing two flaps of a receptacle in overlying relation by two-stroke relative movement of the mechanism and receptacle, comprising a plow surface engageable successively with said flaps for folding them in the same direction and disengageable therefrom on the forward stroke, means for holding the initially folded flap in folded position during a portion of the return stroke, the other flap upon disengagement from said plow surface being free at least partially to recover its original position, and a second plow surface engageable on the return stroke with this free flap to fold said flap over the initially folded flap.

2. Mechanism for closing flaps of a receptacle in overlying relation by two-stroke relative movement of the mechanism and receptacle, comprising a plow surface engageable successively with two non-adjacent flaps of the receptacle for folding them in the same direction and disengageable therefrom on one stroke, means for folding an intermediate flap upon the initially folded flap, and a second plow surface engageable on the return stroke with the second-folded flap for refolding it to overlie the folded intermediate flap.

3. Mechanism operable on forward and return strokes for sealing three angularly related flaps of a receptacle closure, comprising means for applying adhesive to the forward flap on the forward stroke and for applying adhesive to a side flap on the return stroke, means operative intermediate said adhesive applying operations for folding said side flap into closed position to receive adhesive on its outer face, and means operable on the return stroke after the application of adhesive to said flaps for folding the rear flap into closed position over the folded side flap.

4. Mechanism for closing flaps of a receptacle, comprising means for folding one flap into closed position across the opening of the receptacle, means for applying adhesive to said flap, means for folding an adjacent flap upon the initially closed flap after application of adhesive to said initially closed flap, thereby to provide adhesive between the initially-closed and second-closed flaps, and means operable thereafter for folding upon the second-closed flap a flap disposed opposite to the initially closed flap.

5. Receptacle closing mechanism comprising folding and gluing means for sweeping the forward and rear flaps of the receptacle to the rear transversely of the receptacle and for applying adhesive to a surface of each of these flaps in the positions thus attained, means for folding a side flap, and means for folding the rear flap upon the folded side flap.

6. Mechanism operable on forward and return strokes of relative movement for sealing three angularly related flaps of a receptacle closure, comprising means for applying adhesive to the outer surface of the forward flap and to the inner surface of the rear flap on the forward stroke, means operable after the application of adhesive to the forward flap for closing a side flap, and means operable on the return stroke to close the rear flap over the closed side flap.

7. Receptacle sealing mechanism comprising an adhesive applicator roll, cooperating plows and guides for positioning a receptacle with respect to the applicator roll with the plane of closure of the receptacle tangent thereto, and with the receptacle in position for one flap to receive adhesive from the roll in a closed position while retaining the side flaps of the receptacle out of the way of the applicator roll, said guide surfaces being disposed to permit disengagement of the side flaps upon disengagement of the said closed flap by the roll, and means for closing said side flaps to permit subsequent application of adhesive thereto by said roll.

8. Receptacle sealing mechanism comprising an adhesive applicator disposed to sweep the plane of ultimate closure of receptacle flaps and in so doing to apply adhesive to one flap in closed position, the adhesive applicator having a width substantially equal to the width of said flap, means for plowing adjacent side flaps out of the way of the adhesive applicator during such application of adhesive, and cam surfaces disposed to fold said side flaps toward closed positions.

9. Mechanism of the class described comprising an adhesive applicator for successively applying adhesive to exposed surfaces of receptacle flaps occupying receptacle-closing positions, means operable after such application of adhesive to one closed flap for folding a second flap into closed position upon the adhesive-coated surface of the first flap in position for the outer surface of this second flap to receive adhesive from the applicator, and means operable after the application of adhesive to the second flap for folding a third flap over the first two flaps.

10. Method of fastening receptacles which comprises closing one flap of the receptacle and applying adhesive to its outer surface thereafter, folding two opposite flaps over the initially closed flap and applying adhesive to the outer surfaces of said two opposite flaps, and thereafter flolding a flap, opposite to the initially closed flap, into closed position over the other flaps.

11. Method of fastening receptacle closures of the type including three flaps, of which two are disposed opposite to each other and comprise extensions of opposite walls of the open receptacle and the third lies intermediate the other two and comprises an extension of another receptacle wall, the method including the steps of closing one of the two opposite flaps and applying adhesive to its outer surface, then folding the intermediate flap over the initially closed flap and applying adhesive to the outer surface of this intermediate flap, and then folding the flap opposite the initially closed flap over the closed intermediate flap.

12. Receptacle sealing mechanism comprising folding and adhesive applying instrumentalities, means for causing a back and forth two-stroke relative movement of the mechanism and receptacle operated upon, the mechanism including an adhesive applicator for applying adhesive to the forward flap of the receptacle in a closed position, a plow element for closing the rear flap of the receptacle on the return stroke, and a folding device actuable intermediate the application of adhesive to the forward flap and the closing of the rear flap to sweep inward transversely of the direction of relative movement of the mechanism and receptacle and thereby close a side flap of the receptacle.

13. Receptacle sealing mechanism comprising an adhesive applicator for applying adhesive to the forward flap of a receptacle in closed position, a plow element for closing the rear flap of the receptacle, a holder for the applicator and plow element, means for causing back and forth relative movement of the holder and a receptacle operated upon, said holder maintaining the applicator and plow at a constant distance such that during application of adhesive to the forward flap the rear flap is free to assume a position wherein subsequent relative movement of the holder and receptacle causes the plow element to close said rear flap.

14. Receptacle sealing mechanism comprising a holder, plow elements therein for spreading apart the side flaps of a receptacle and folding the forward and rear flaps in the same direction into an approximately common plane, an applicator in the holder for applying a coat of adhesive to the folded forward flap, folding devices operable transversely of the direction of folding of said forward and rear flaps for closing side flaps of the receptacle over the coated forward flap, and a plow element in the holder for closing the rear flap over said side flaps.

15. Receptacle sealing mechanism comprising a holder and means for causing straight-line two-stroke relative movement of the holder and a receptacle operated upon, said holder carrying folding and adhesive applying instrumentalities occupying constant positions with respect to each other and reacting on the receptacle flaps during both the forward and return strokes, and folding devices moving transversely of the path of said relative movement and in synchronism therewith for closing a pair of side flaps of the receptacle.

16. Receptacle sealing mechanism comprising a holder and means for causing straight-line two-stroke relative movement of the holder and a receptacle operated upon, plow elements in the holder for spreading apart the side flaps of a receptacle, an adhesive applicator roll in the holder adapted to sweep the plane of ultimate closure of the flaps, tucker fingers for closing side flaps of the receptacle, said fingers having cam surfaces disposed to move the side flaps toward closed positions prior to actuation of the said tucker fingers, means actuable by the relative movement of the holder and receptacle for moving the tucker fingers toward and from each other in timed relation to the progression of the holder and receptacle, and a plow element engageable with the last-closed flap of the receptacle for closing said flap upon the return stroke of relative movement of the holder and receptacle.

17. Mechanism of the class described comprising an adhesive applicator positioned to apply adhesive to the exposed surface of a flap of the receptacle occupying a receptacle-closing position, means for disposing another, angularly related, closure flap of the receptacle in closed position to receive adhesive from the said applicator, and means for folding an outer closure flap over the last of a plurality of flaps having thus received adhesive.

18. Mechanism of the class described comprising an adhesive applicator disposed substantially tangentially of the plane to be occupied by closed flaps of a receptacle and adapted to retain a flap of a receptacle in a closed position in said plane and to apply adhesive thereto, and a folding instrumentality operable after such application of adhesive to fold another flap of the receptacle over the initially folded flap.

19. Mechanism for closing flaps of a receptacle, comprising means for folding one flap into closed position across the opening of the receptacle to be closed thereby, means for applying adhesive to said flap, means for concomitantly folding two opposite flaps upon the initially closed flap after application of adhesive to said initially closed flap, and means operable thereafter for folding upon the second-closed flaps a flap disposed opposite to the initially closed flap.

20. Mechanism for closing the flaps of a receptacle by two-stroke relative movement of the mechanism and receptacle, comprising a plow element disposed to permit the passage of a flap upon the forward stroke and to fold said flap into closed position upon the return stroke.

21. Receptacle sealing mechanism comprising folding and adhesive-applying instrumentalities operable to close and apply adhesive to two angularly related flaps of a receptacle, and a plow element occupying a constant position with respect to said adhesive-applying instrumentality, for closing the outer flap of the receptacle.

22. Receptacle sealing mechanism for receptacles having flaps occupying forward, side and rear relative positions, comprising plow elements for disposing rear and side flaps of a receptacle in outwardly extending positions approaching the ultimate plane of closure of the flaps, an adhesive applicator for applying a coat of adhesive to the forward flap of the receptacle in closed position and to the rear flap in the said outwardly extending position, a folding device for closing a side flap over the closed and coated forward flap, and a plow element adapted to close the rear flap over the closed side flap.

23. Receptacle sealing mechanism comprising an adhesive applicator operable to sweep the approximate plane of ultimate closure of flaps of a receptacle, the applicator being thus adapted to apply a coating of adhesive to the outer surface of one flap in a closed position and to the inner surface of the opposite flap in an outwardly extending position, and folding mechanism associated with the applicator for folding said opposite flap over the initially coated flap with a third flap disposed therebetween.

24. Receptacle sealing mechanism comprising an adhesive applicator operable to sweep the approximate plane of ultimate closure of flaps of a receptacle upon forward and return strokes of relative movement of the applicator and receptacle, the applicator being disposed with respect to the receptacle to apply adhesive to the outer surface of a flap in closed position of the flap, and means, operable after such application of adhesive to said flap, for disposing another flap of the receptacle in closed position to be engaged by the applicator on the return stroke.

25. Receptacle sealing mechanism operating on forward and return strokes, comprising an adhesive applicator and a plow member positioned in operative relation to flaps of a receptacle to be sealed, said plow member having a plow surface disposed to fold receptacle flaps in one direction preparatory to the application of adhesive thereto, and having a plow surface disposed to refold one of the previously folded flaps into closed position.

Signed by me at Boston, Massachusetts, this 25th day of June, 1930.

WARREN D. JORDAN.